US008579253B2

(12) United States Patent
Brace et al.

(10) Patent No.: US 8,579,253 B2
(45) Date of Patent: Nov. 12, 2013

(54) FUEL INJECTOR VALVE

(75) Inventors: Wiliam Brace, Otalampi (FI); Pekka Hautala, Espoo (FI); Jukka Kiijarvi, Kylmala (FI); Markus Niemi, Vantaa (FI)

(73) Assignee: Wartsila Finland Oy, Vaasa (FI)

( * ) Notice: Subject to any disclaimer, the term of this patent is extended or adjusted under 35 U.S.C. 154(b) by 252 days.

(21) Appl. No.: 13/254,745

(22) PCT Filed: May 28, 2010

(86) PCT No.: PCT/FI2010/050433

§ 371 (c)(1),
(2), (4) Date: Sep. 2, 2011

(87) PCT Pub. No.: WO2010/136653

PCT Pub. Date: Dec. 2, 2010

(65) Prior Publication Data

US 2011/0315908 A1 Dec. 29, 2011

(30) Foreign Application Priority Data

May 28, 2009 (FI) ..................................... 20095597

(51) Int. Cl.

*F16K 31/02* (2006.01)
*B05B 1/08* (2006.01)
*F02M 61/20* (2006.01)
*F02M 51/00* (2006.01)

(52) U.S. Cl.

USPC ................... 251/129.06; 251/337; 239/102.2; 239/585.5; 239/533.9

(58) Field of Classification Search

USPC ............. 251/129.06, 129.19, 337; 239/102.2, 239/585.3–585.5, 533.9; 123/498; 310/325, 310/326, 330

See application file for complete search history.

(56) References Cited

U.S. PATENT DOCUMENTS 3,718,283 A * 2/1973 Fenne ........................ 239/533.4
4,285,471 A * 8/1981 Eblen et al. ................ 239/533.4
4,728,074 A * 3/1988 Igashira et al. ................. 251/57
5,803,361 A * 9/1998 Horiuchi et al. ................ 239/88
6,199,767 B1 * 3/2001 Male et al. ........................ 239/5

(Continued)

FOREIGN PATENT DOCUMENTS

DE 199 16 277 A1 10/2000
DE 103 10 499 A1 9/2003

(Continued)

*Primary Examiner* — John K Fristoe, Jr.
*Assistant Examiner* — Seth W Mackay-Smith
(74) *Attorney, Agent, or Firm* — Muncy, Geissler, Olds & Lowe, PLLC

(57) ABSTRACT

A fuel injector valve (1) of a piston engine, which comprises a fuel chamber (3) for the fuel to be injected, a valve needle (9) for guiding the fuel injection from the fuel chamber (3) into the cylinder (4) of the engine, a spring (10) for pressing the valve needle (9) towards the closed position, and a piezoelectric actuator (11) for guiding the valve needle (9). Additionally, the injector valve (1) comprises a drawbar (22), which is loosely coupled to the valve needle (9), a second drawbar (23), which is attached to the piezoelectric actuator (11) and loosely coupled to the drawbar (22), and that the injector valve (1) comprises a second spring (24) fitted in connection with the drawbar (22) for pressing the valve needle (9) towards the closed position and a third spring (25) fitted in connection with the second drawbar (23) for pressing the valve needle (9) towards the closed position.

14 Claims, 2 Drawing Sheets

(56) References Cited

U.S. PATENT DOCUMENTS

| | | | | |
|---|---|---|---|---|
| 6,575,385 | B1 | 6/2003 | Stier | |
| 6,843,434 | B2 * | 1/2005 | Lawrence et al. | 239/533.2 |
| 7,406,951 | B2 * | 8/2008 | Stoecklein | 123/498 |
| 2005/0205686 | A1 * | 9/2005 | Yildirim et al. | 239/102.2 |

FOREIGN PATENT DOCUMENTS

| | | | |
|---|---|---|---|
| GB | 2 318 152 | A | 4/1998 |
| GB | 2 323 702 | A | 9/1998 |
| VA | 103 60 449 | A1 | 9/2004 |
| WO | WO 03/067071 | A1 | 8/2003 |

* cited by examiner

FUEL INJECTOR VALVE

This invention relates to a fuel injector valve of a piston engine.

In diesel engines, the fuel is injected as a fine mist from the fuel injector valve into the combustion space of the cylinder such that with eddies of air is achieved a good mixture of fuel and combustion air and combustion that is as perfect as possible. Fuel injected by the injector valve as tiny droplets vaporizes quickly as combustion begins after a short ignition delay. A spring-loaded valve needle is ordinarily used as a shut-off element in an injector valve, which valve needle is generally guided hydraulically by the pressure of the fuel or other hydraulic fluid.

Due to ever more stringent emissions regulations, the emissions created by piston engines must be decreased. It is, however, at the same time desired that the performance of the engine be kept at the same level or even improved. One means of achieving these goals is to adjust with greater accuracy the amount of fuel injection and the timing and duration of injection during the injection event. The accuracy of adjustment of fuel injection can be improved by guiding the valve needle of the injector valve using a piezoelectric actuator. Typically, an injector valve equipped with a piezoelectric actuator comprises a hydraulic or mechanical motion amplifier, with which the motion of the actuator is amplified prior to its transmission to the valve needle. The motion amplifier makes the structure of the valve needle complex and may weaken the accuracy of adjustment of the fuel injection.

The object of the invention is to provide an equipped fuel injector valve with a simple structure, which is equipped with a piezoelectric actuator.

The object of the invention is achieved by the injector valve described in claim 1. The injector valve comprises a fuel chamber for the fuel to be injected, a valve needle for guiding the injection of fuel from the fuel chamber into the cylinder of the engine, a spring for pressing the valve needle towards the closed position and a piezoelectric actuator for guiding the valve needle. Additionally, the injector valve comprises a drawbar, which is loosely coupled to the valve needle, a second drawbar, which is attached to the piezoelectric actuator and loosely coupled to the drawbar. A second spring for pressing the valve needle towards the closed position is arranged in connection with the drawbar, and a third spring for pressing the valve needle towards the closed position is arranged in connection with the second drawbar.

With the invention, significant advantages are achieved.

By an injector valve according to the invention, the amount of fuel injection and the timing and duration of injection can be adjusted during the injection event with great accuracy and speed, thus reducing engine emissions and increasing the power of the engine. With the injector valve, it is, for example, possible to achieve a pre-injection that is smaller than the main injection. Because the valve needle is guided directly by the piezoelectric actuator, there is no need in the injector valve for a hydraulic circuit or other arrangement, with which the magnitude of the motion of the piezoelectric actuator is amplified prior to transfer to the valve needle. Due to this, the structure of the injector valve can be kept simple. Additionally, an injector valve directly guided by a piezoelectric actuator is fast and reliable.

In one embodiment of the invention, a second spring affecting a drawbar is arranged to press the valve needle towards the closed position only after the valve needle has opened to a specific clearance. With this construction, it is possible to overcome the force of fuel pressure affecting the tip of the valve needle in the fuel chamber, whereby less force is required to close the valve needle. The force required to open the valve needle is also decreased.

In the following, the invention is described in greater detail by means of examples and with reference to the accompanying drawings.

Figure 1:
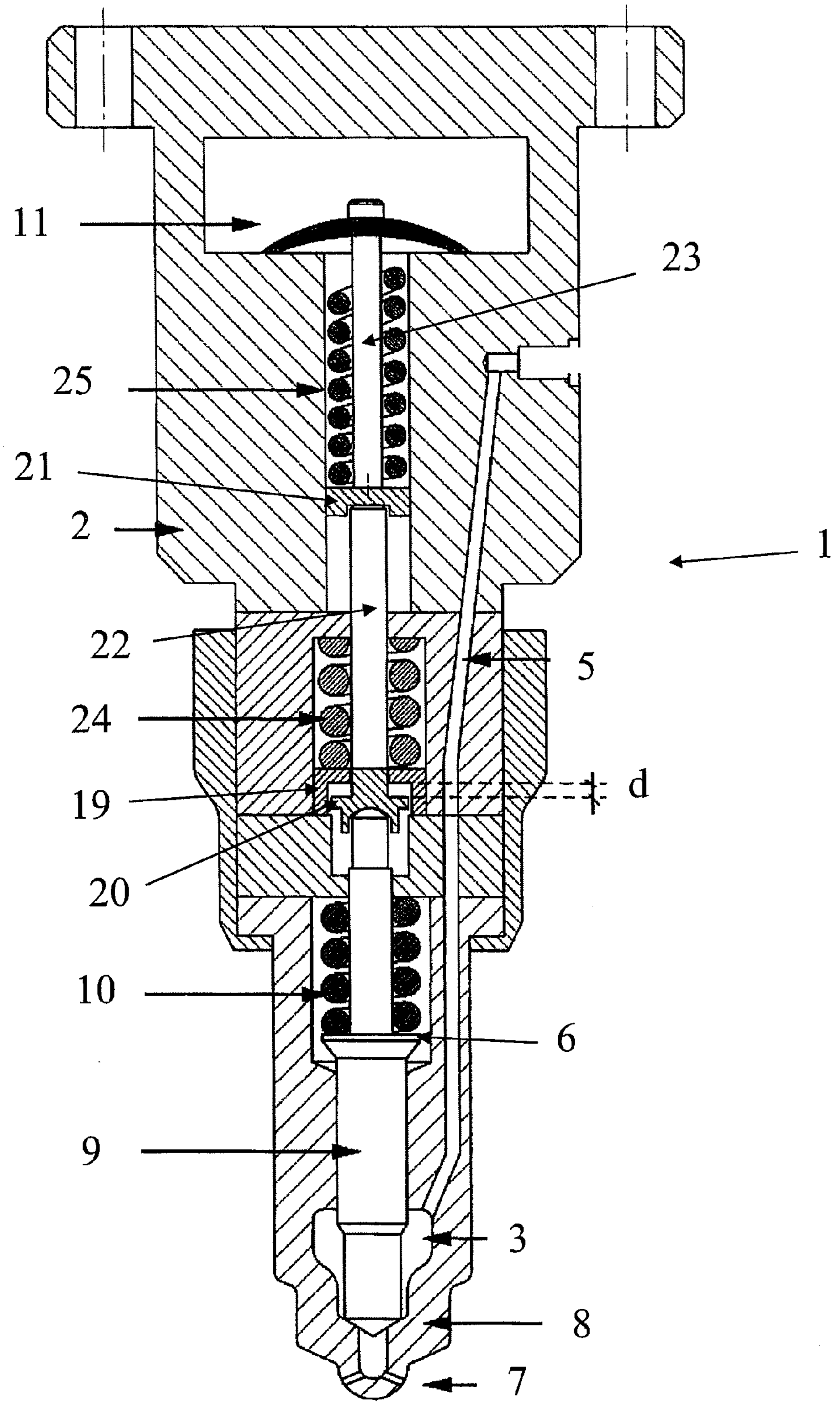
FIG. 1 shows as a cross-section a fuel injector valve according to the invention, which is equipped with a piezoelectric actuator.

FIG. 1 shows an injector valve 1 for injecting fuel into the combustion space 4 of a cylinder of a piston engine. The injector valve 1 can be installed in connection with the cylinder head of the engine. The injector valve 1 comprises a body 2, which has a fuel chamber 3 for the fuel to be injected into the combustion space 4. The fuel chamber 3 is in the flow connection with the fuel source through the fuel duct 5 in the body 2. The fuel source is, for example, a pressure accumulator or so-called common rail, into which fuel is fed at high pressure and from which fuel is led to one or more injector valves. The body 2 has nozzle openings 7 through which fuel is injected from the fuel chamber 3 into the combustion space 4. The injector valve 1 comprises a valve needle 9, with which the injection of fuel is guided from the fuel chamber 3 into the combustion space 4. The fuel chamber 3 has a seat surface 8, against which the valve needle 9 is pressed by a spring 10. The spring 10 is fitted between the body 2 and the supporting surface 6 of the valve needle 9.

The injector valve 1 comprises a drawbar 22, which is loosely coupled to the valve needle 9. The first end of the drawbar 22 is loosely coupled to the second end of the valve needle 9. The injector valve 1 comprises a second drawbar 23, which is loosely coupled to the drawbar 22. The first end of the second drawbar 23 is loosely coupled to the second head of the drawbar 22. The second end of the second drawbar 23 is attached to the piezoelectric actuator 11.

Additionally, the injector valve 1 comprises a second spring 24 fitted in connection with the drawbar 22. The second spring 24 is fitted around the drawbar 22, between the body 2 and the holder 19 supported by the fame 2. The second spring 24 affects the drawbar 22 in order to press the valve needle 9 towards the closed position. The holder 19 is fitted around the drawbar 22 such that the drawbar 22 can move in its longitudinal direction in relation to the holder 19. The drawbar 22 comprises a second supporting surface 20. The second supporting surface 20 is at a clearance distance d from the holder 19, when the injector valve 1 is in the closed position according to FIG. 1. The magnitude of the clearance d is at least 1 mm, typically 1-2 mm.

In the first end of the second drawbar 23, there is a third supporting surface 21. The injector valve 1 comprises a third spring 25 fitted in connection with the second drawbar 23. The third spring 25 is fitted around the second drawbar 23, between the third supporting surface 21 and the body 2. The third spring 25 affects the second drawbar 23 in order to press the valve needle 9 towards the closed position.

The injector valve 1 comprises a piezoelectric actuator 11 for guiding the valve needle 9 i.e. for moving it between the open and closed positions. In the closed position, the valve needle 9 is against the seat surface 8 and thus prevents the flow of fuel from the fuel chamber 3 into the combustion space 4. In the open position, the valve needle 9 is free of the seat surface 8, whereby fuel is allowed to flow between the seat surface 8 and the valve needle 9 into the combustion space 4.

The second end of the second drawbar 23 is attached directly to the piezoelectric actuator 11. The movement of the piezoelectric actuator 11 creates a movement of the valve needle 9 that is of corresponding magnitude. The valve needle 9 is directly guided by the piezoelectric actuator 11. The injector valve 1 does not comprise a hydraulic, mechanical or other motion amplifier, with which the magnitude of the motion produced by the actuator 11 is changed prior to transmission to the valve needle 9.

In the embodiment of FIG. 1, the piezoelectric actuator 11 is a so-called Thunder (Thin Unimorph Driver) actuator. A Thunder actuator comprises two sheets with different heat expansion coefficients, for example, metal sheets, between which is fitted a layer of piezo material at an elevated temperature. When the temperature drops, the actuator 11 becomes arched. The second head of the second drawbar 23 is attached to the midpoint of the arc. The edges of the actuator 11 are attached to the body 2.

The function of the piezoelectric actuator 11 is based on the piezoelectric phenomenon. The length of the piezo material of the actuator changes in response to an electrical field. The piezo material comprises piezo crystals, which are ordinarily made from PZT ceramics, which comprise lead, zirconium and titanium.

In the closed position according to FIG. 1, the spring 10 and the third spring 25 press the valve needle 9 against the seat surface 8. To begin fuel injection, a voltage is switched to the piezoelectric actuator 11, i.e. the actuator 11 is activated. Then, the actuator 11 forms an electrical field having such a direction that the actuator 11 lengthens and the midpoint of the arc of the actuator 11 rises upwards. At the same time, the second drawbar 23 attached to the arc travels a corresponding distance and the third spring 25 is compressed. The force caused by the pressure of the fuel in the fuel chamber 3 presses the valve needle 9 towards the open position. The force of the spring 10 alone is not capable of keeping the valve needle 9 in the closed position, whereby the valve needle 9 rises from the seat surface 8 and injection of fuel from the fuel chamber 3 through the nozzle openings 7 into the combustion space 4 begins. When the valve needle 9 has opened to a clearance d, the second spring 24 also begins to resist the opening movement of the valve needle 9. At the same time, the pressure force moving the valve needle 9 towards the open position increases, because the fuel pressure also affects the tip of the valve needle 9, i.e. the first end. The opening force is so great that not even the second spring 24 can resist the movement of the valve needle 9, and the valve needle 9 opens completely. In the fully open position, the valve needle 9 has travelled a distance that corresponds in magnitude to that of the second drawbar 23 moved by the actuator 11.

To stop the injection of fuel, the voltage switched to the actuator 11 is switched off, whereby the actuator 11 shortens back to its original length. The spring 10, the second spring 24 and the third spring 25 press the valve needle 9 towards the closed position. During the final phase of the closing movement (clearance d), the force of the second spring 24 no longer affects the valve needle 9, but nonetheless the force of the spring 10 and the third spring 25 and the kinetic energy of the valve needle 9 move the valve needle 9 into the closed position against the seat surface 8. At the same time, injection of fuel from the fuel chamber 3 into the combustion space 4 ceases. When the fuel injection is restarted, a voltage is once again switched to the actuator 11.

Figure 2:
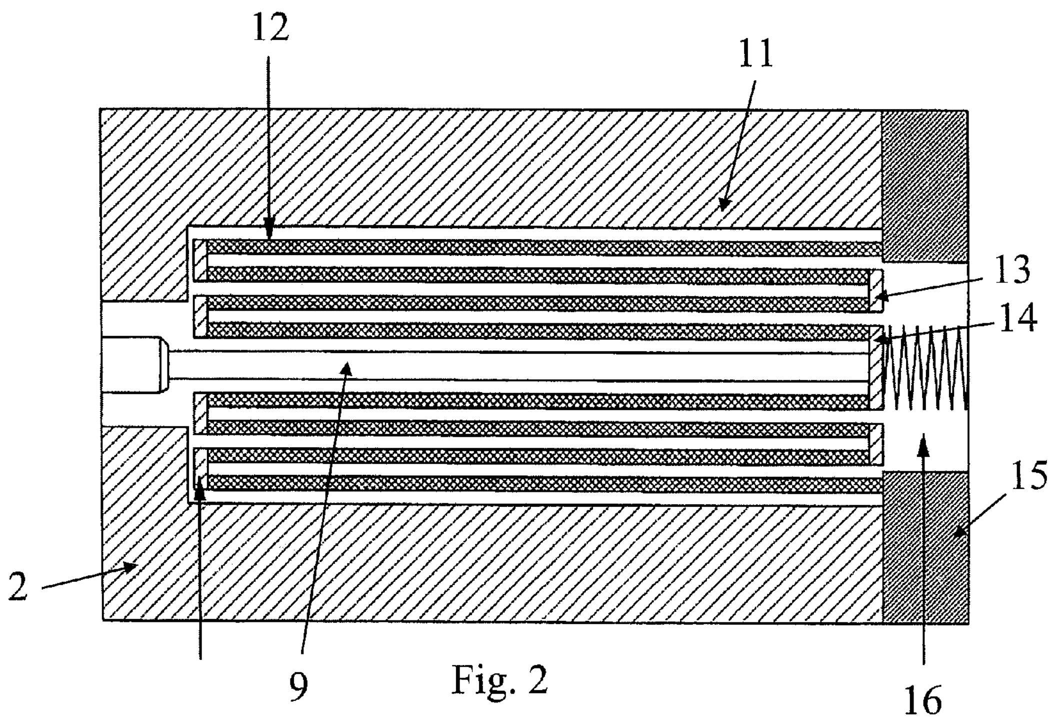
FIG. 2 shows as a cross-section a second piezoelectric actuator, which can be used in the injector valve of FIG. 1.

FIG. 2 shows a telescopic piezoelectric actuator 11, which can be used in the injector valve of FIG. 1. The actuator 11 comprises piezo elements 12, which are fitted within each other. The piezo elements 12 are cylindrical. The piezo elements 12 are arranged to move telescopically in relation to one another, when a voltage is switched to the actuator 11. The ends of adjacent piezo elements 12 are coupled to one another by end connectors 13. Each piezo element 12 is coupled by an end connector 13 from at least one of its ends to the corresponding side end of an adjacent i.e. an inner or outer, piezo element 12. Except for the innermost and outermost piezo elements 12, the first and second end of each piezo element is coupled by an end connector 13 to the corresponding side end of the adjacent, inner or outer, piezo element. The second end of the outermost piezo element is attached to the end connector 15 of the actuator. The first end of the outermost piezo element is attached to the first end of the adjacent, inner piezo element. Correspondingly, the second end of the inner piezo element is coupled to the second end of the adjacent, inward piezo element, etc. The first end of the innermost piezo element is coupled to the first end of the adjacent, outer piezo element. The second end of the innermost piezo element 12 is attached to the middle end connector 14. The first end of the piezo element 12 is the end on the side of the fuel chamber 3 and the second end is the end further away from the fuel chamber 3. The end connectors 13, 14 are made, for example, of aluminium. The second drawbar 23 is attached directly to the middle end connector 14.

The piezoelectric actuator 11 is preloaded, whereby it better withstands tensile stress. Preload is achieved by a preload spring 16, which is located between the end connector 15 and the middle end connector 14 of the actuator. The magnitude of the preload is typically about one tenth of the greatest load of the piezoelectric actuator 11.

Piezo elements 12 are arranged in the actuator 11 such that when a voltage is switched over the piezo elements 12, every other piezo element lengthens and every other one shortens. The change in length occurs in the axial direction of the piezo elements 12.

When injection of fuel begins, the piezoelectric actuator 11 is activated i.e. a voltage is switched to the actuator 11, whereby the outermost piezo element shortens, the inner piezo element next to it lengthens and the inner piezo element next to this shortens, etc. The innermost piezo element lengthens. The motion of the piezo elements 12 is transferred by the end connectors 13 from the previous piezo element to the next, inner piezo element 12. Thus, the travel distance of the innermost piezo element is the greatest. The piezo elements 12 move telescopically in relation to one another. The second end of the innermost piezo element moves away from the fuel chamber 3. The second drawbar 23 attached to the middle end connector 14 moves a distance corresponding to that of the middle end connector 14, and the second spring 25 is compressed. Then, the valve needle 9 moves into the open position in a manner corresponding to that of the embodiment in FIG. 1, and the injection of fuel from the fuel chamber 3 through the nozzle openings 7 into the combustion space 4 begins. When injection of fuel into the combustion space 4 is stopped, the voltage supply to the actuator 11 is switched off, whereby the piezo elements 12 return to their original lengths. The spring 10, the second spring 25 and the third spring 25 press the valve needle 9 towards the closed position in a manner corresponding to that of the embodiment in FIG. 1, and injection of fuel from the fuel chamber 3 into the combustion space 4 ceases. Injection of fuel resumes, when a voltage is once again switched to the actuator 11.

The total travel distance of the second drawbar 23 is as great as the absolute value sum of the changes in length of the piezo elements 12. The total travel distance of the second drawbar 23 is the lengthening/shortening of one piezo element 12 multiplied by the number of piezo elements 12, in the event that the piezo elements 12 shorten and lengthen by the same amount, when the actuator 11 is activated. The magnitude of the change in length of the piezo elements 12 and thus the magnitude of the movement of the second drawbar 23 and the valve needle 9 can be adjusted by altering the magnitude of the voltage switched to the actuator 11. This way, the amount of fuel injection can be adjusted during the injection event. The injection event can, for example, be divided into several parts, which enables more exact control of fuel combustion. The actuator 11 comprises such a number of piezo elements 12 that the valve needle 9 is made to travel the desired distance.

Figure 3:
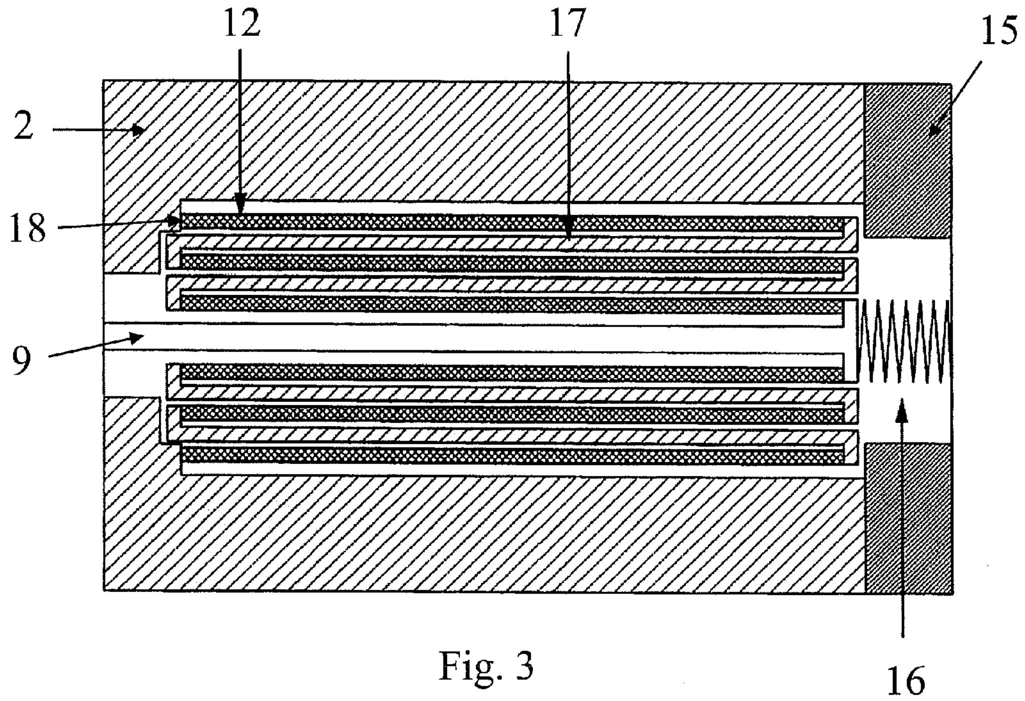
FIG. 3 shows as a cross-section a third piezoelectric actuator, which can be used in the injector valve of FIG. 1.

FIG. 3 shows another telescopic type of piezoelectric actuator 11, which can be used in the injector valve of FIG. 1. The actuator 11 comprises piezo elements 12, which are fitted within each other. The piezo elements 12 are cylindrical. The piezo elements 12 are arranged to move telescopically in relation to one another, when a voltage is switched to the actuator 11. The opposing ends of adjacent piezo elements 12 are coupled to each other by bushings 17. The second end of the outer piezo element 12 and the first end of the inner piezo element 12 next to it are coupled to each other by a bushing 17. Correspondingly, the second end of the inner piezo element is coupled by a bushing 17 to the first end of the more inward piezo element. The first end of the outermost piezo element 12 is attached to the supporting surface 18 of the body 2. The bushings 17 are made, for example, of aluminium. The second drawbar 23 is attached directly to the piezoelectric actuator 11. The second end of the second drawbar 23 is attached directly to the second end of the innermost piezo element 12.

The piezoelectric actuator 11 is preloaded, whereby it better withstands tensile stress. Preload is achieved by a preload spring 16, which is located between the end 15 of the actuator and the second end of the second drawbar 23. The magnitude of the preload is typically about one tenth of the greatest load of the piezoelectric actuator 11.

The piezo elements 12 are arranged in the actuator 11 such that their change in length occurs in the same direction, when a voltage is switched to the actuator 11. In the embodiment according to FIG. 3, each piezo element 12 lengthens, when a voltage is switched to the actuator 11. Using the bushings 17, the motion of the piezo elements 12 is transferred from the previous piezo element to the next, inner piezo element. The travel distance of the innermost piezo element is the greatest. The innermost piezo element moves away from the fuel chamber 3. The total movement of the innermost piezo element and the movement of the second drawbar 23 are the same in magnitude as the sum of the length changes of the piezo elements 12. The innermost piezo element can be cylindrical or enclosed, a so-called piezo stack formed from several piezo sheets stacked one on top of the other and onto which the second end of the second drawbar 23 is attached.

When injection of fuel begins, the piezoelectric actuator 11 is activated, or a voltage is switched to the actuator 11. Then, the actuator 11 forms an electrical field having such a direction that all the piezo elements 12 lengthen. The piezo elements 12 move telescopically in relation to one another. The innermost piezo element 12 moves away from the fuel chamber 3 and the second drawbar 23 attached to it moves a corresponding distance. As in the embodiments of FIGS. 1 and 2, the valve needle 9 rises from the seat surface 8, whereby fuel is allowed to flow from the fuel chamber 3 through the nozzle openings 7 into the combustion space 4. When injection of fuel from the fuel chamber 3 into the combustion space 4 is stopped, the voltage switched to the actuator 11 is switched off, whereby the piezo elements 12 shorten to their original lengths and the spring 10, the second spring 24 and the third spring 25 press the valve needle 9 back against the seat surface 8 in the same manner as in the embodiments of FIGS. 1 and 2. Injection of fuel resumes, when a voltage is once again switched to the actuator 11.

The travel distance of the second drawbar 23 is equal to the sum of the lengthening or shortening of the piezo elements 12. The total travel distance of the second drawbar 23 is the length change of one piezo element 12 multiplied by the number of piezo elements 12, in the event that the piezo elements 12 shorten or lengthen by the same amount, when the actuator 11 is activated. The magnitude of the change in the length of the piezo elements 12 and thus the magnitude of the movement of the second drawbar 23 valve needle 9 can be adjusted by altering the magnitude of the voltage of the actuator 11. This way, the amount of fuel injection can be adjusted during the injection event. The injection event can, for example, be divided into several parts, which enables more exact control of fuel combustion. The actuator 11 comprises such a number of piezo elements 12 that the valve needle 9 is made to travel the desired distance.

The function of the piezoelectric actuator 11 in the embodiments of FIGS. 2 and 3 is also based on the piezoelectric phenomenon. The actuator 11 comprises piezo elements 12 made of a piezoelectric material, the length of which piezo elements 12 changes in response to an electrical field. The piezo elements 12 comprise piezo crystals, which are ordinarily made from PZT ceramics, which comprise lead, zirconium and titanium.

In all the embodiments described above, the motion produced by the actuator 11 is transmitted directly to the valve needle 9 without a hydraulic, mechanical or other motion amplifier, with which the magnitude or strength of the motion produced by the actuator 11 is changed prior to transmission to the valve needle 9.

The invention claimed is:

1. A fuel injector valve of a piston engine, which comprises a fuel chamber for the fuel to be injected, a valve needle for guiding the fuel injection from the fuel chamber into the cylinder of the engine, a spring for pressing the valve needle towards the closed position, and a piezoelectric actuator for guiding the valve needle, wherein the injector valve comprises a drawbar, which is loosely coupled to the valve needle, a second drawbar, which is attached to the piezoelectric actuator and loosely coupled to the drawbar, and that the injector valve comprises a second spring arranged in connection with the drawbar for pressing the valve needle towards the closed position and a third spring arranged in connection with the second drawbar for pressing the valve needle towards the closed position.

2. The injector valve according to claim 1, wherein the second spring is arranged to press the valve needle towards the closed position only after the valve needle has opened to a clearance (d).

3. The injector valve according to claim 2, wherein the magnitude of the clearance (d) is 1-2 mm.

4. The injector valve according to claim 1, wherein the piezoelectric actuator comprises piezo elements, whose length changes, when the actuator is activated.

5. The injector valve according to claim 1, wherein the piezoelectric actuator comprises piezo elements, which are arranged to move telescopically in relation to one another, when the actuator is activated.

6. The injector valve according to claim 1, wherein the piezoelectric actuator comprises piezo elements fitted within each other.

7. The injector valve according to claim 6, wherein each piezo element is coupled from at least one of its ends to an adjacent, inner or outer piezo element.

8. The injector valve according to claim 7, wherein the adjacent piezo elements are coupled to each other from their ends on the same side.

9. The injector valve according to claim 7, wherein the adjacent piezo elements are coupled to each other from their opposing ends.

10. The injector valve according to claim 4, wherein the piezo elements are arranged in the actuator such that in adjacent piezo elements occurs a change in length in the opposite direction, when the actuator is activated.

11. The injector valve according to claim 4, wherein the piezo elements are arranged in the actuator such that in the piezo elements occurs a change in length in the same direction, when the actuator is activated.

12. The injector valve according to claim 7, wherein the second drawbar is attached to the innermost piezo element or the middle end connector, which is attached to the end of the innermost piezo element.

13. The injector valve according to claim 1, wherein the piezoelectric actuator comprises two sheets with different heat expansion coefficients, between which is fitted piezo material.

14. The injector valve according to claim 13, wherein the actuator is arched, and the valve needle is attached to the midpoint of the arc.

* * * * *